May 20, 1952 L. MARKIN 2,597,654
FABRICATION OF GARMENT FASTENING ELEMENT
Filed March 2, 1950 5 Sheets-Sheet 1
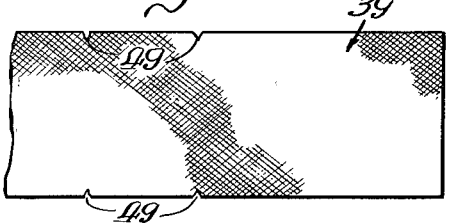
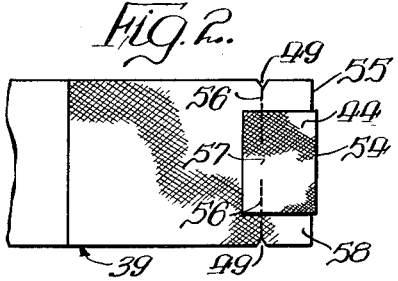
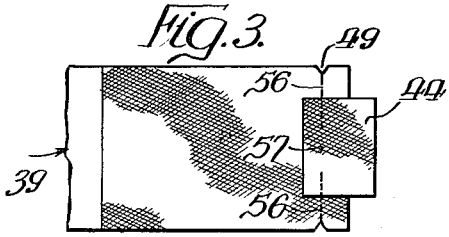
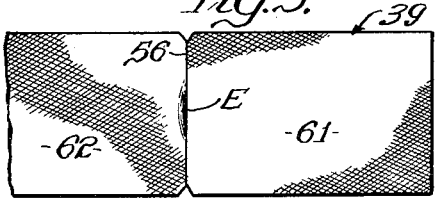
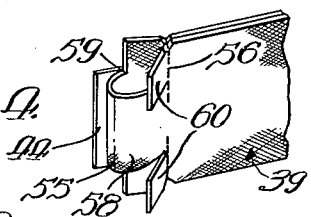
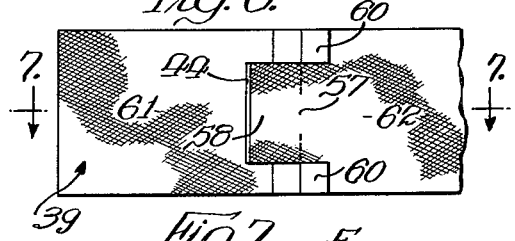
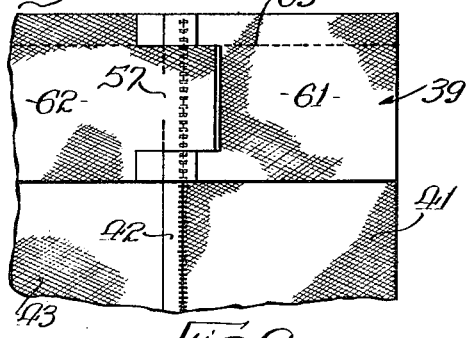
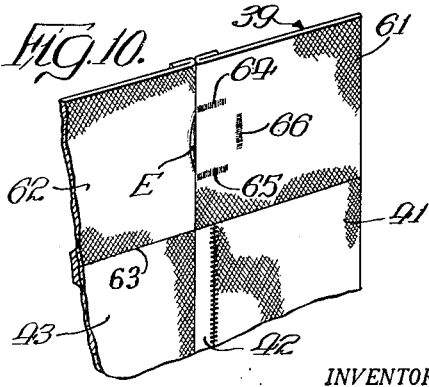
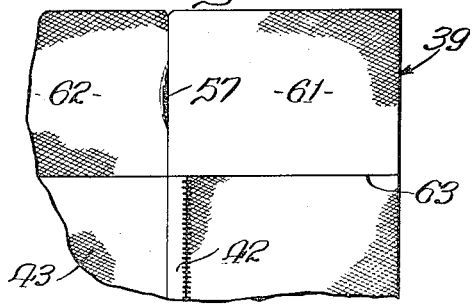
INVENTOR.
Louis Markin
BY
Attys.

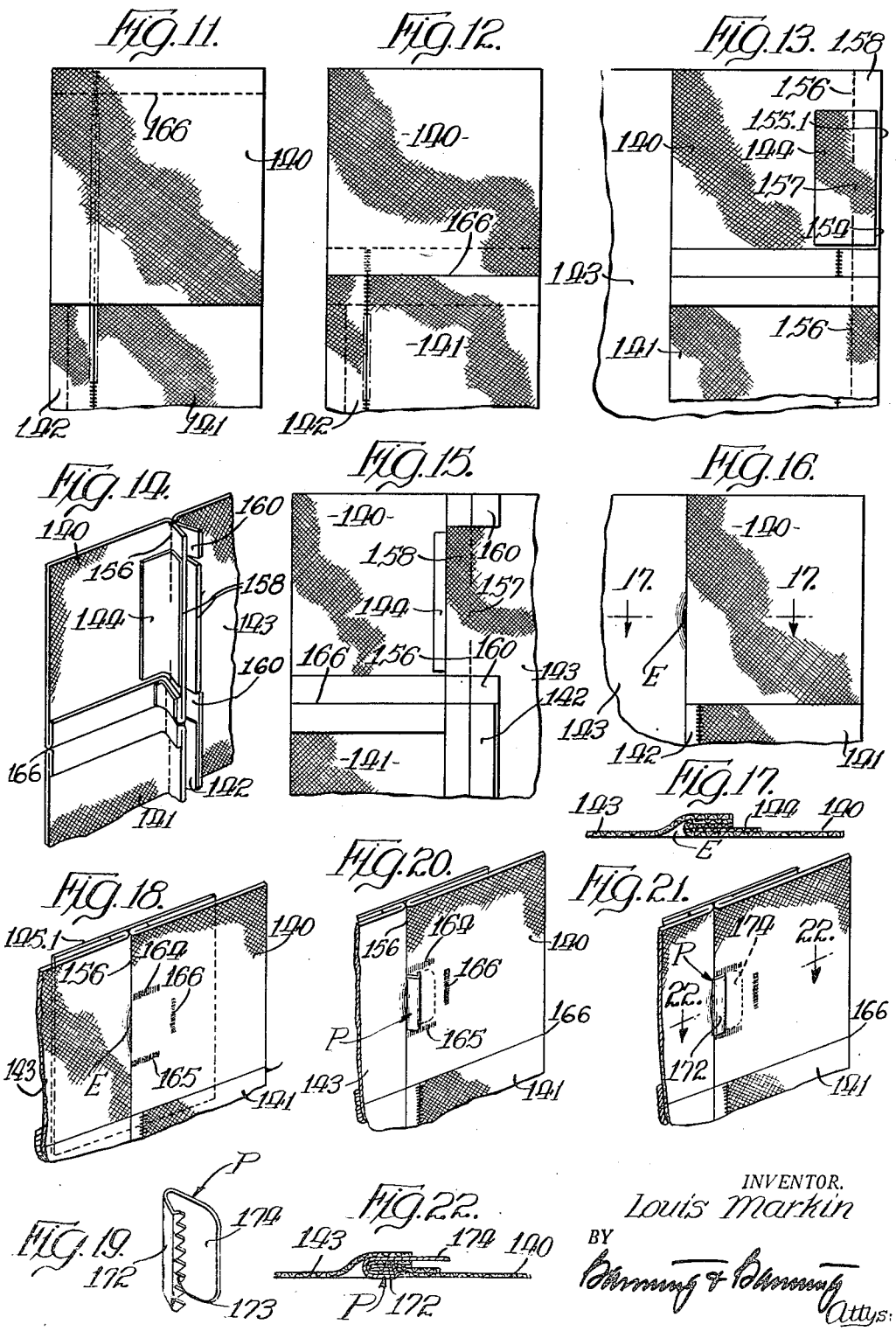

May 20, 1952  L. MARKIN  2,597,654
FABRICATION OF GARMENT FASTENING ELEMENT
Filed March 2, 1950  5 Sheets-Sheet 3
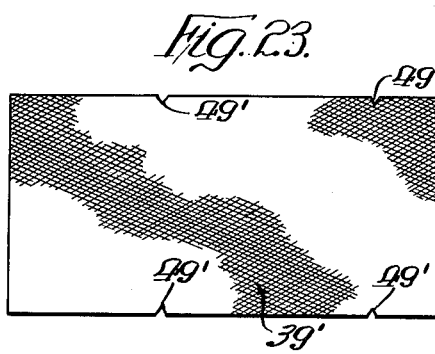
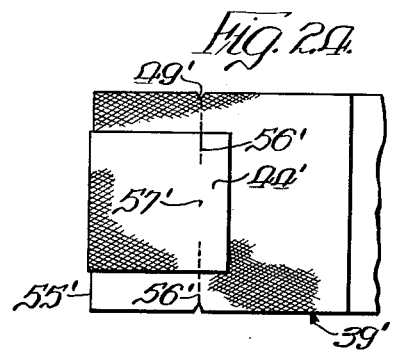
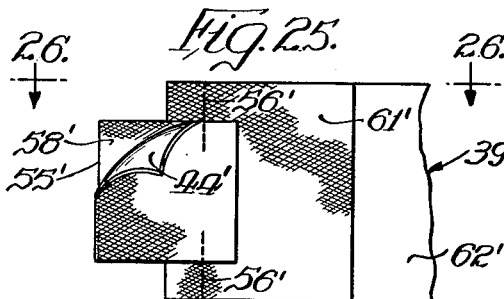
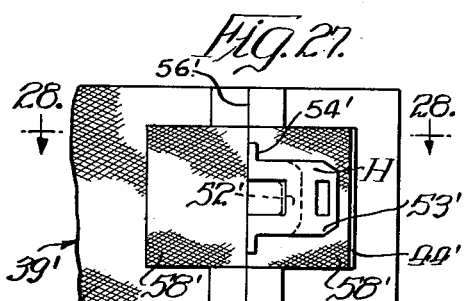
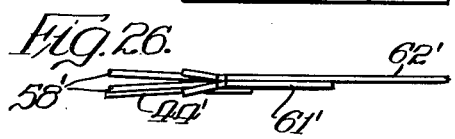
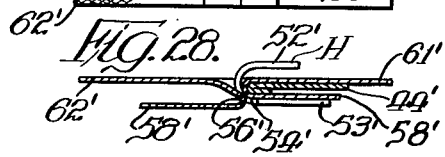
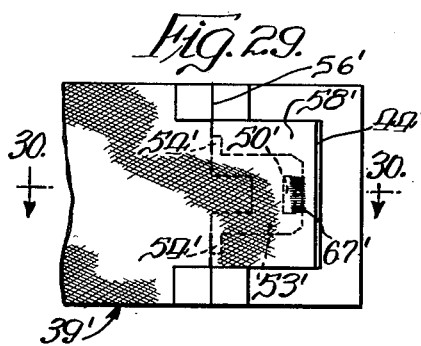
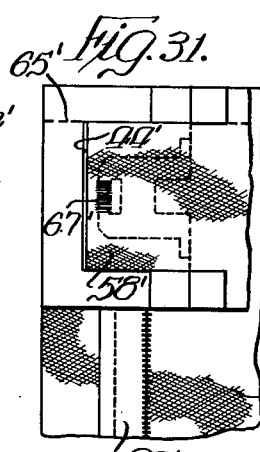
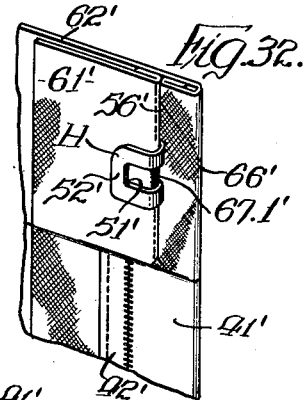
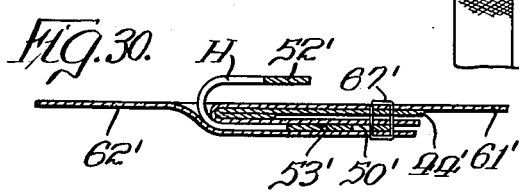
INVENTOR.
Louis Markin
BY
Banning & Banning
Attys.

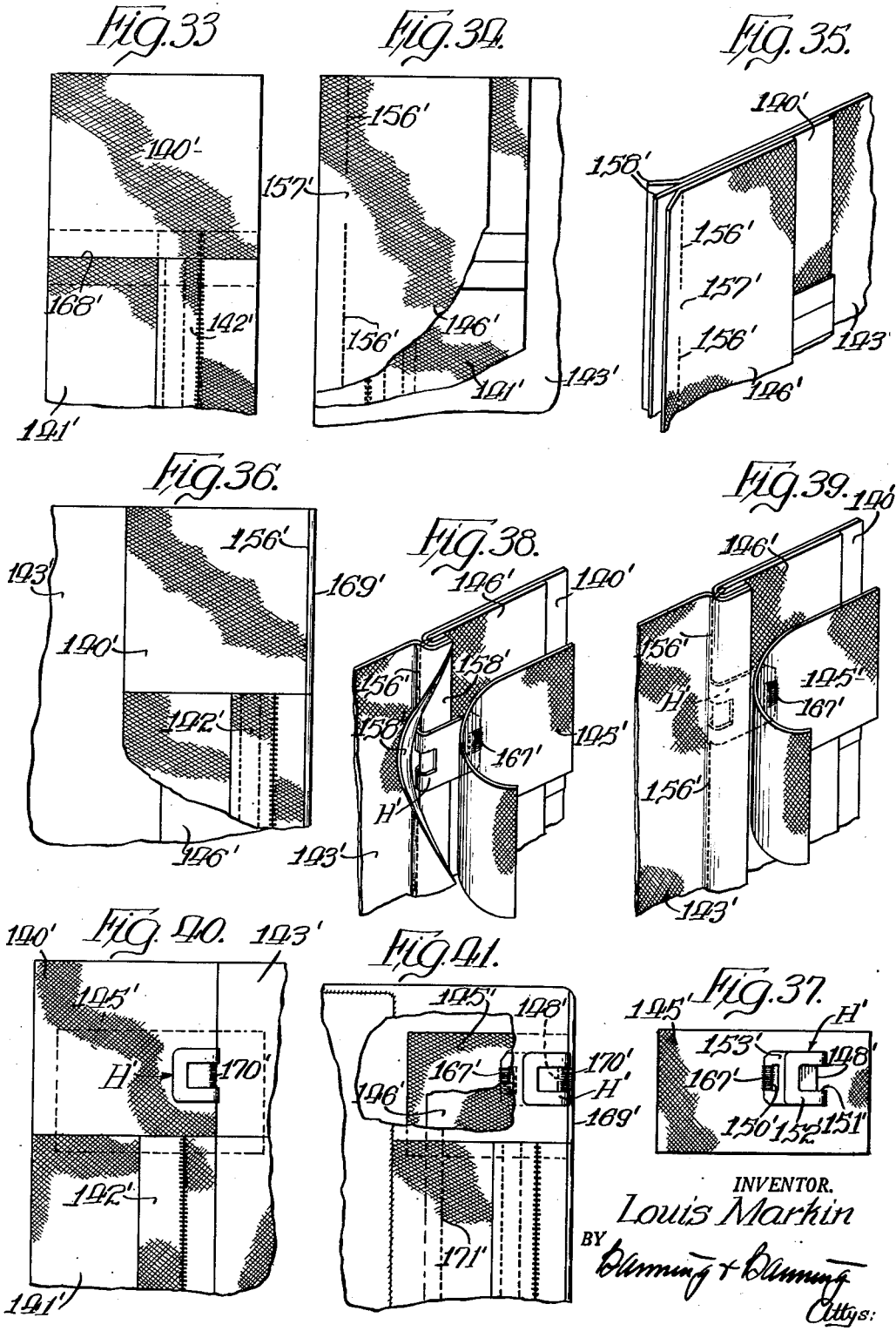

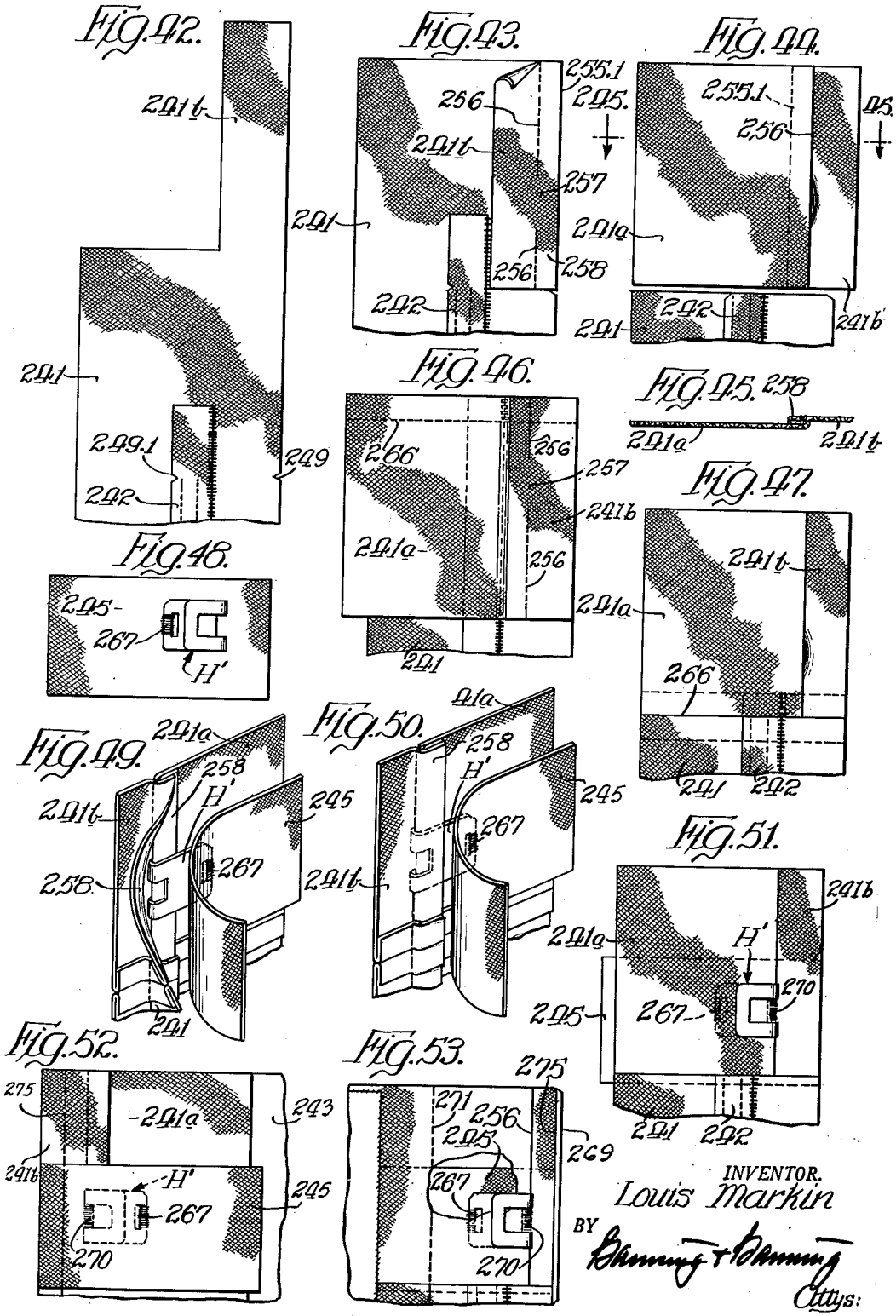

Patented May 20, 1952

2,597,654

UNITED STATES PATENT OFFICE 2,597,654

FABRICATION OF GARMENT FASTENING ELEMENT

Louis Markin, Chicago, Ill., assignor, by mesne assignments, to Hook-Flex Company, Chicago, Ill., a copartnership Application March 2, 1950, Serial No. 147,251

15 Claims. (Cl. 2—235)

This invention relates generally to the fabrication of garments, and particularly to the production of a small opening in a garment, as at its waistband, to serve either as an eye in which may be caught a hook attached to another part of the waistband, or to permit the insertion and attachment of such a hook to coact with such an eye or a catch on the opposite end of the waistband and thereby aid in holding the garment on the wearer. Although the invention as herein shown is applied to men's trousers, it will be understood that it may be used with equal facility on women's trousers and skirts, or on jackets, sweaters, belts, and the like for both sexes.

In the fabrication of men's trousers there has always been a problem of satisfactorily fastening the waistband ends at the point where the fly overlaps. This has been especially true where the modern slide fastener has been used for the connection. Buttons and button holes leave the button exposed, unless the button holes are formed on the under section of the fly. The use of metal hooks on the edge of the fly often results in the hook becoming exposed, especially after extended use. The insertion of the hook through a slit in the garment fabric inwardly from the edge has not proven a satisfactory solution.

The main objects of this invention, therefore, are to provide an improved form and method of producing in the waistband section of a garment an eye into which may be either caught a hook attached to the overlapping part of the garment for holding the same about the waist of the wearer, or into which may be inserted a hook to be attached to the garment and used for catching an eye of this kind formed in, or a conventional catch attached to, the underlying waistband section of the garment; to provide an improved method of producing an eye of this kind which fully conceals the hook under the overlying waistband sections of the garment; to provide an improved manner of stitching adjacent the eye which will insure the minimum distortion of the bordering portions resulting from long use; to provide an improved form and method of producing an eye of this kind which can be employed with great facility in the mass production of garments and by workmen much less skilled than those required for custom tailoring; and to provide an improved form and method of producing an eye of this kind which is especially adapted for use with garments employing the modern slide fastener.

The drawings illustrate this improved form of and method of producing an eye for two different types of men's trousers, and for two different uses. One type of trousers has a waistband formed of a piece of material, separate from the main parts of the trousers, but which is subsequently stitched thereto. The other type of trousers has no separately formed waistband.

One of the two uses of this improved form of eye is to have it caught by a hook attached to the part of the garment so as to secure the overlapping ends of the garment together. When so used the eye may be reinforced and the exposed edge protected by a clip. The other use is to permit a hook to be inserted in the eye and stitched to the garment.

Figs. 1–10 illustrate the successive steps for forming the eye in the waistband type of trousers for the first of the above uses;

Figs. 11–18 illustrate the successive steps for forming the eye in the "no waistband" type of trousers for the first of the above uses;

Fig. 19 illustrates in perspective a protector which is applicable to the edge of the fabric eye;

Fig. 20 illustrates the Fig. 18 eye construction to which the edge protector of Fig. 19 is in process of being applied;

Fig. 21 which is a view similar to Fig. 20 illustrates the protector in the final stage of its assembly with the fabric eye;

Fig. 22 is a detail in section, taken on line 22—22 of Fig. 21;

Figs. 23–32 illustrate the successive steps for forming an eye in the waistband type of trousers for the second of the above uses;

Figs. 33–41 illustrate the successive steps in forming an eye in the "no waistband" type of trousers for the second of the above uses;

Figs. 42–53 illustrate a modification in the successive steps in forming an eye for either of the aforesaid type of trousers for the second of the above uses.

To avoid repetition, the steps of procedure illustrated by these several figures will be explained in describing the successive steps for forming the eye in each of these types of trousers for the respective uses.

In a pair of trousers provided with an improved form of eye E, produced by the herein described improved method, there is involved the use of either a waistband 39 or 39' (Figs. 1–10, 23–32, respectively) or a waistband square 140 or 140' (Figs. 11–18, 33–37, respectively), a fly 41, 141, 41', 141' or 241 to which is stitched the tape of one part of a slide fastener 42, 142, 42', 142' or 242, a garment forepart 43, 143, 143' or 243, stay material 44, 144, 44', 145' or 245, a fly lining facing 146' and a hook H or H'.

For the waistband type of garment, with the waistband extending entirely around the trousers, the waistband 39 or 39' is a narrow strip of the material used for the main part of the garment. Inwardly from one end of the strip, spaced notches 49 or 49' are cut on both edges to indicate the line along which the strip is to be folded for producing the improved form of eye E. For the other type of garment, the waistband square 140 or 140' is a small section of the material used for the main part of the garment. The fly likewise is a piece of garment material which is cut to appropriate shape and has the tape of one part of the slide fastener attached thereto.

The forepart 43, 143, 143' or 243 of the garment is previously cut and formed about the top edge as is generally required for the attachment of the waistband 39 or 39' or of the waistband square 40 or 140'.

The material 44, 144, 44' or 145 is impregnated with a thermoplastic composition so that upon the application of heat, in the pressing of parts of the garment, the stay material will be firmly adhered to the parts upon which it has been superimposed. The stay material 44, 144, 44' or 145 and the fly facing 146' (see Fig. 41), where the latter is used, are standard materials employed for this purpose.

Two slightly different forms of the hook H and H' may be used in connection with this improved eye construction, as most clearly shown in Figs. 27-32 and in Figs. 33-41. Either form comprises a metal plate formed with a transverse aperture 50' or 150' and a longitudinal slot 51' or 151', and this plate is doubled upon itself to provide a tongue 52' or 152' and a base 53' or 153'. The aperture 50' or 150' is located in the hook base 53' or 153' whereas the slot 51' or 151' is in the tongue 52' or 152'. In the form of hook H shown in Figs. 27-32, transversely disposed integral ears 54' are formed on the base 53' adjacent the point of bend which offsets the tongue 52' therefrom.

Stated in its most general terms, the procedure in forming this improved eye E comprises the following steps:

Step 1.—Superimposing the several pieces of material in which the eye E is to be formed.

Step 2.—Stitching these superimposed pieces of material together, except for a predetermined distance, for the purpose of forming a gap which is eventually to become the eye E.

Step 3.—Cutting, separating, and pressing the seam allowance along the line of stitching.

Step 4.—Attaching these superimposed parts thus formed to the forepart of the garment, and Step 5.—Then, finally, either applying reinforcing bar tacks adjacent the eye E, or inserting a hook H and securing it to the garment by bar tacks.

The specific procedure by which these several steps are carried out, for the two different types of trousers and for the two different uses, will now be set forth as they are illustrated in the drawings.

As hereinbefore noted, Figs. 1-18 illustrate the slight variations in the foregoing steps required for forming an eye E in trousers having either a waistband separately formed or one without a waistband separately formed from the material constituting the main parts of the garment. Figs. 1-10 illustrate the specific procedure for the former type of garment, whereas Figs. 11-18 illustrate the specific procedure for the latter type garment.

In forming the eye E for trousers with the separate waistband, one end of the waistband 39, as shown in Fig. 1, is first folded upon itself so as to bring the notches 49 into registration, as shown in Fig. 2. A block of stay material 44, narrower than the strip 39, is then laid upon this folded waistband strip, with the edge 54 of the stay material extending slightly beyond the fold 55 in the waistband strip 39.

Thereupon, these superimposed parts are secured together by transverse stitching 56 extending inwardly from the edges of the waistband material 39 at the point of and in alinement with the registering notches 49. The stitching extends inwardly from each edge less than half the width of the strip 39, thus forming a gap 57 which subsequently becomes the eye E.

Following the stitching of these superimposed parts, the corner portions of the folded seam allowance 58 are cut away outwardly of and along the lateral edges of the stay material 44 and inwardly of the fold 55, as most clearly shown in Figs. 4 and 6. For one of the seam allowances these cuts terminate at 59 at the transverse line which defines the inner cut of the corner portions aforesaid; the cuts for the other seam allowance extend inwardly to the stitching 56, thereby forming tabs 60 which are severed from the corresponding seam allowance 58.

The waistband strip 39 is then unfolded, as shown in Fig. 5, so that the sections 61 and 62 thereof extend in opposite directions from the seam formed by the line of stitching 56. The material is then pressed with a hot iron so as to dispose the folded seam allowance 58 for both sections 61 and 62, together with the stay material 44, down against the face of the waistband section 61 but with the tabs 60 folded down against the section 62, as most clearly indicated in Figs. 6 and 7.

The waistband is then laid face down upon the outer face and along the upper edge of the trousers forepart 43 to which has been previously stitched the fly 41 with its attached slide fastener 42. These superimposed parts are then stitched together by a line of stitching 63 (see Fig. 8).

The waistband 39 is next turned outwardly and upwardly, as shown in Fig. 9, and the folded-down seam allowance 58 for both sections 61 and 62 of the waistband material 39 and the intervening stay material 44 are secured to the waistband section 61 by bar tacks 64, 65 and 66, to define and reinforce the eye E. As will be noted from Fig. 10, the bar tacks 64 and 65 extend longitudinally of the waistband 39 outwardly from the termini of the stitching 56, whereas the bar tack 66 extends transversely of the waistband 39 in spaced relation to the stitching 56. This latter bar tack serves as an abutment for the inner end of the hook H so that the pull of the hook is against the bar tack 66 rather than against the folded edge of the waistband section 39.

In forming the eye E for trousers not having a separate waistband section, a slightly different procedure is followed, as indicated in Figs. 11-18. A waistband square 140 is first faced downwardly upon the outer face of the upper end of the fly 141 to which is attached the slide fastener 142. The square and fly are then secured together by stitching 166, as shown in Fig. 11. The waistband square 140 is then unfolded, as shown in Fig. 12, and the two parts are superimposed face downwardly upon the garment forepart 143 with a block of stay material 144 superimposed thereon, as shown in Fig. 13. This is a narrower piece of material than that used with the waistband 139, and the edge 154 of the stay material 144 is disposed slightly inward from the edge 155.1 of the superimposed waistband square and garment forepart. Thereupon these superimposed parts are secured together by transverse stitching 156, extending inwardly from the opposite edges of the waistband square 140 with the inner ends of the stitches terminating a predetermined distance so as to form a gap 157 which subsequently is to become the eye E.

Subsequently these superimposed parts are unfolded, as shown in Fig. 14, and the seam allowance 158 for the forepart 143 is cut along the lateral edges of the stay material 144 so as to form tabs 160 similar to those formed in the modification shown in Fig. 5. Thereupon these unfolded parts are pressed with a hot iron so as to lay the seam allowances 158 for the waistband square 140 and the forepart 143 and the stay material 144 down against the waistband square 140.

The tabs 160 are laid down against the forepart 143. These folded-down seam allowances 158 and the intervening stay material 144 are secured to the waistband square 140 by bar tacks 164, 165 and 166, as shown in Fig. 18, for the same purpose as previously explained.

Where desired, an auxiliary block of stay material 145.1 may be caught on the back of the waistband 140 and forepart 143 by the bar tacks, as indicated in dotted outline in Fig. 18.

The material defining the eye E may be reinforced and the exposed edges protected against wear by the employment of a protector P, as shown in Figs. 19–21. This protector has a shorter leg 172 formed with a serrated flange 173 opposed to a longer leg 174. When used, the protector P is inserted into the eye E with the exposed edge of the eye between the two legs 172 and 174 and seated against the bend of the protector. The shorter leg 172 is then pressed down against the intervening garment material so as to cause the serration 173 to bend over and grip the garment material.

Although shown here as applied to the "no waistband" type of trouser, it will be understood the protector may be applied with equal facility to the eye for the "waistband" type of trouser formed as shown in Figs. 1–10.

As previously indicated, Figs. 23–53 illustrate one procedure for forming an eye of this kind in which is to be inserted and secured a hook H so as to be caught in an eye of this character formed in, or one of the conventional types of catches secured to, the other end of the waistband. Figs. 23–32 show the procedure for preparing the eye and inserting the hook for the waistband type of trousers. One procedure for trousers of the type which do not have a waistband formed separately from the main parts of the garment is indicated in Figs. 33–41. A still further procedure of forming an eye for this second use, and applicable for either type of trousers, is shown in Figs. 42 to 53.

In carrying out one procedure for this second use, for the waistband type of trousers, the end of the waistband 39', which is slightly wider than that shown in Figs. 1–10, is notched, folded over, and a block of stay material 44' is superimposed thereon. In this case the stay material is a bit larger than that used for the formation of the eye E, as shown in Figs. 1–10. However, the block of stay material is positioned about the same. These superimposed parts are secured together by stitching 56', and the end portions of the folded seam allowances are cut away in practically the same manner as hereinbefore explained and illustrated in connection with Figs. 1–4 (see Figs. 23–32), except that in this instance the folded seam allowance 58' is slit along the fold 55' so as to separate the seam allowances for the two sections 61' and 62'. The sections 61' and 62' of the waistband 39' are thereupon unfolded and a heated iron is applied to press the seam allowances 58' down against their respective sections 61' and 62', with the stay material block 44' interposed between the seam allowance 58' and the section 61'.

A hook H is thereupon inserted through the eye with the fold in the section 61' interposed between the tongue and base 52' and 53' of the hook H, as most clearly shown in Figs. 27 and 28. The ears 54' are set against the inner ends of the stitches 56', as most clearly shown in Figs. 28 and 29. Thus the strain on the hook H is applied directly to the stitches 56' at opposite sides of the eye. The hook H is secured to the waistband section 61' and the superimposed seam allowances 58' (the seam allowance 58', for the waistband 39', being first folded over onto the hook H) and intermediate stay material 44' by a bar tack 67' extending through the aperture 50' in the hook base 53', as most clearly shown in Figs. 29, 30, and 31.

The waistband 39' with the attached hook H is laid face-down upon the upper end of the fly 41' with its attached fastener 42' and the parts secured together by stitching 65' (see Fig. 31). Following this stitching operation, the waistband 39' is unfolded from the fly 41' and the folded edge of the section 61' with the intervening stay material 44' is secured by a bar tack 67.1' to the section 62'. The section 61' is folded over onto the section 62' with the stitching 56' disposed inwardly of the fold 66' formed by this doubling back of the waistband upon itself, as most clearly shown in Fig. 32.

The procedure for forming the eye and inserting the hook H' for the type of trousers without the waistband, is clearly illustrated in Figs. 33–41. In this procedure the waistband square 140' is first attached to the fly 141' by stitches 168' in the conventional manner. Thereupon these attached parts are superimposed face-down upon a forepart 143' on top of which is superimposed a strip of fly facing 146'. These parts are secured together by stitching 156' along the edges of such superimposed material, arranged transverse to the top of the forepart 143' (see Figs. 34 and 35). The stitching 156' terminates at a predetermined point to form a gap 157' for the eye into which the hook is subsequently to be inserted. The fold of these parts is then reversed and pressed to form a crease 169' in the forepart 143' slightly offset from the stitches 156' (see Fig. 36).

The parts are then unfolded and the hook H', attached to a separate block of stay material 145' by a bar tack 167', is inserted into the eye by first separating the seam allowances 158', as most clearly shown in Fig. 38. A bar tack 170' in the hook slot 151' unites the folded edge of the waistband square 140' with the intervening fly lining to the adjacent forepart 143'. In this construction the longitudinal slot 151' is extended lengthwise of the base 153' for only a brief distance so as to provide adjacent the bar tack 170' an engaging shoulder 148' which coacts therewith to resist the pulling strain imposed on the hook H' in normal use of the garment. Following such attaching of the hook H', the waistband square 140' and the attached fly 141' are again folded back upon the forepart 143', whereupon all of these superimposed parts (the block of stay material 145' and the fly lining 146' included) are secured together by stitching 171'.

A procedure for forming an eye for use in inserting and attaching a hook, and positioning it inwardly of the fly edge a greater distance than is possible with the procedure shown in Figs. 33–41, is illustrated in Figs. 42–53.

The piece of material cut to form a fly 241 is provided with an extension 241b and is notched at 249. The tape of one part of a slide fastener 242 is stitched to the fly 241 with a notch 249.1 therein aligned with the notch 249. The stitching for the slide fastener tape is terminated at the notch 249.1 (see Fig. 42).

The extension 241b which forms a tongue is folded down onto the body of the fly with the end of the extension registering with the notches 249 and 249.1. These superimposed parts are then secured together by a longitudinal line of stitching 256 with a skip in the stitching so as to form the gap 257 which subsequently becomes an eye for the insertion of the hook H.

The fly 241 and the fastener tape 242 are cut transversely along the line of the notches 249 and 249.1 and along the fold of the extension 241b (see Figs. 44 and 43, respectively), thus forming a block 241a to which is stitched the extension 241b now separated from the main fly part 241. The part 241b is unfolded and the seam allowance 258 folded down against the part 241a (see Fig. 45).

These severed parts are then superimposed on each other with the normal outer faces opposed and with the outer lateral edges of the severed and unfolded extension 241b and the main part of the fly 241 in alignment, as shown in Fig. 46. It will be noted that this moves the eye inwardly from the line on which the gap 257 was formed by the stitches 256 (see Fig. 43). When thus positioned, these parts are stitched together transversely as indicated at 266 in Fig. 46, and then unfolded to the position shown in Fig. 47.

The seam allowances 258 are then separated as shown in Fig. 49, and the hook H', attached to a piece of stay material 245 by a bar tack 267 (see Fig. 48), is inserted into the eye, as shown in Fig. 9. The seam allowance 258 for the piece 241b is then allowed to assume its normal position to overlie the hook H', as shown in Fig. 50. Thereupon the hook H' is anchored in place by a bar tack 270 extending through the seam allowances 258.

These parts are then laid face down on the garment forepart 243 and stitched at 275 along the lateral edge (see Fig. 52). When done, the parts are then unfolded sidewise, i. e. to place the seam allowances between these parts, and the forepart 243 pressed to form the crease 269. This step locates the hook H' inwardly from the crease 269 a distance considerably greater than is the case with the form shown in Fig. 41.

Other variations and modifications in the details of structure and arrangement of the parts may be resorted to within the spirit and coverage of the appended claims.

It will be noted that in each of the forms of the invention the eye formed by interrupting the line of stitches to form a gap in the line of stitches and provide an eye for the reception of a hook, is located interiorly of the garment band and the material at opposite sides of the eye and forming the side walls thereof is free and it is extended inwardly beyond the gap to provide a hook receiving pocket which is closed at the inner end by means which forms an abutment for the hook.

I claim:

1. In a nether garment, a waistband, one end of said waistband comprising two overlapping sections of material, one of said sections extending beyond one end of the other section, one of said sections being folded along a line spaced from one end thereof in the overlapping zone, said pair of sections having a line of stitching passing through the juxtaposed portions of the sections along the fold line of said section having a fold line therein, and said stitching being interrupted intermediately of its ends to provide a gap defining an eye spaced from the said end of the waistband, and cooperating fastener means on the other end of the waistband adapted to cooperate with said eye when the waistband is in body encircling position.

2. In a nether garment, a waistband, one end of said waistband comprising two overlapping sections of material, one of said sections having one edge terminating beyond one end of the other section, one of said sections being folded along a first fold line spaced from one end thereof in the overlapping zone, said pair of sections having a joint along a second fold line defined by common ends of the pair of sections, said pair of sections further having a line of stitching passing through the juxtaposed portions of the sections along said first fold line, and said stitching being interrupted intermediately of its ends to provide a gap defining an eye spaced from the said end of the waistband, and cooperating fastener means on the other end of the waistband adapted to cooperate with said eye when the waistband is in body encircling position.

3. In a nether garment, a waistband, one end of said waistband comprising two overlapping sections of material, one of said sections extending beyond one end of the other section, one of said sections being folded along a first fold line spaced from one end thereof in the overlapping zone, means joining said sections along a second fold line defined by common ends of the pair of sections, said pair of sections further having a line of stitching passing through the juxtaposed portions of the sections along said first fold line, and said stitching being interrupted intermediately of its ends to provide a gap defining an eye spaced from the said end of the waistband, and cooperating fastener means on the other end of the waistband adapted to cooperate with said eye when the waistband is in body encircling position.

4. In a nether garment, a waistband, one end of said waistband comprising a pair of overlapping sections of material, one of said sections extending beyond one end of the other section, one of said sections being folded along a fold line spaced from one end thereof in the overlapping zone to define a pocket between the overlapping portions of the sections, said sections having a line of stitching passing through the juxtaposed portions of the sections along said fold line, said stitching being interrupted intermediately of its ends to provide a gap defining an eye spaced from said end of the waistband and opening into said pocket, and means joining said sections along a second fold line defined by common ends of the pair of sections, said second fold line being spaced from said stitching and providing a bottom for the pocket to limit the penetration of cooperating fastener means, and cooperating fastener means on the other end of the waistband adapted to cooperate with said eye when the waistband is in body encircling position.

5. In a nether garment, a waistband, one end of said waistband comprising a pair of overlapping sections of material, one of said sections extending beyond one end of the other section, one of said sections being folded along a fold line spaced from one end thereof in the overlapping zone to define a pocket between the overlapping portions of the sections, said sections having a line of stitching passing through the juxtaposed portions of the sections along said fold line, said stitching being interrupted intermediately of its ends to provide a gap defining an eye spaced from said end of the waistband and opening into said pocket, said sections being integrally joined along a second fold line defined by common ends of the pair of sections, said second fold line being spaced from said stitching and providing a bottom for the pocket to limit the penetration of a cooperating fastener means, and cooperating fastener means on the other end of the waistband adapted to cooperate with said eye when the waistband is in body encircling position.

6. In a nether garment, a waistband, one end of said waistband comprising a pair of overlapping sections of material, one of said sections extending beyond one end of the other section, one of said sections being folded along a first fold line spaced from one end thereof in the overlapping zone to define a pocket between the overlapping portions of the sections, said sections having a line of stitching passing through the juxtaposed portions of the sections along said fold line, said stitching being interrupted intermediately of its ends to provide a gap defining an eye spaced from said end of the waistband and opening into said pocket, means joining said sections along a second fold line spaced from said first fold line and defined by common ends of the pair of sections, and bar tacks uniting said material and disposed transversely of the line of stitching at opposed termini thereof which define the eye, and cooperating fastener means on the other end of the waistband adapted to cooperate with said eye when the waistband is in body encircling position.

7. In a nether garment, a waistband, one end of said waistband comprising a pair of overlapping sections of material, one of said sections extending beyond one end of the other section, one of said sections being folded along a fold line spaced from one end thereof in the overlapping zone to define a pocket between the overlapping portions of the sections, said sections having a line of stitching passing through juxtaposed portions of the sections along said fold line, said stitching being interrupted intermediately of its ends to provide a gap defining an eye spaced from said end of the waistband and opening into said pocket, a bar tack uniting said material parallel to and spaced from said stitching to limit the penetration of a hook into the eye, and bar tacks uniting said material and disposed transversely of the line of stitching at opposed termini thereof which define the eye, and cooperating fastener means on the other end of the waistband adapted to cooperate with said eye when the waistband is in body encircling position.

8. In a nether garment, a waistband, one end of said waistband comprising two overlapping sections of material, one of said sections having one end thereof extending beyond one end of the other section, one of said sections being folded along a fold line spaced from one end thereof in the overlapping zone, said pair of sections having a line of stitching passing through the juxtaposed portions of the sections along said fold line, said stitching being interrupted intermediately of its ends to provide a gap defining an eye spaced from the said end of the waistband, portions of the sections of material at their overlapping ends adjacent the stitching constituting seam allowances, portions of said seam allowances providing side walls extending from the eye to define a hook receiving pocket, bar tacks disposed transversely of said stitching at the inner termini thereof at said gap and uniting with one section the seam allowances of said sections, and an additional bar tack uniting the one section and the seam allowances intermediately of said first mentioned bar tacks and spaced from the gap to limit penetration of a hook into said eye, and cooperating fastener means on the other end of the waistband adapted to cooperate with said eye when the waistband is in body encircling position.

9. In a nether garment, a waistband, one end of said waistband comprising two overlapping sections of material, one of said sections having one end thereof extending beyond one end of the other section, one of said sections being folded along a fold line spaced from one end thereof in the overlapping zone, a block of reinforcing material overlying at least portions of the sections in the overlapping zone, said pair of sections and block having a line of stitching passing through the juxtaposed portions of the sections along said fold line, said stitching being interrupted intermediately of its ends to provide a gap defining an eye spaced from the said end of the waistband, the overlapping portions of the sections of material bordering said stitching constituting seam allowances, and bar tacks extending transversely of said stitching at the inner termini thereof at said gap, uniting with one of the sections, said block and said seam allowances so as to form reinforcements at the ends of said eye, and cooperating fastener means on the other end of the waistband adapted to cooperate with said eye when the waistband is in body encircling position.

10. In a nether garment, a waistband, one end of said waistband comprising two overlapping sections of material, one of said sections having one end thereof extending beyond one end of the other section, one of said sections being folded along a fold line spaced from one end thereof in the overlapping zone, a block of reinforcing material overlying at least portions of the sections in the overlapping zone, said pair of sections and block having a line of stitching passing through the juxtaposed portions of the sections along said fold line, said stitching being interrupted intermediately of its ends to provide a gap defining an eye spaced from the said end of the waistband, the overlapping portions of the sections of material bordering said stitching constituting seam allowances, said seam allowances having longitudinal slits spaced from the upper and lower edges and at opposing sides of said eye with the portions between said slits arranged flat on one of said sections with said block interposed therebetween, and bar tacks uniting the superimposed pieces of material, including the last referred to section, said block and the last referred to portions of the seam allowances between the slits to define a reinforced pocket, and cooperating fastener means at the other end of the waistband adapted to cooperate with said eye when the waistband is in body encircling position.

11. In a nether garment, a waistband, one end of said waistband comprising two overlapping sections of material, one of said sections having one end thereof extending beyond one end of the other section, one of said sections being folded along a fold line spaced from one end thereof in the overlapping zone, a block of reinforcing material overlying at least portions of the sections in the overlapping zone, said pair of sections and block having a line of stitching passing through the juxtaposed portions of the sections along said fold line, said stitching being interrupted intermediately of its ends to provide a gap defining an eye spaced from the said end of the waistband, the overlapping portions of the sections of material bordering said stitching constituting seam allowances, said seam allowances having longitudinal slits spaced from the upper and lower edges and at opposing sides of said eye with the portions between said slits flat on one of said sections with said block interposed therebetween, and bar tacks uniting the superimposed pieces of material, including the last referred to section, said block and the last referred to portions of the seam allowances between the slits to define a reinforced pocket adapted to receive a hook, and a hook inserted into said pocket and attached to at least one of the superimposed pieces of material, and cooperating fastener means on the other end of the waistband adapted to cooperate with said hook when the waistband is in body encircling position.

12. In a nether garment, a waistband, one end of said waistband comprising two overlapping sections of material, one of said sections having one end thereof extending beyond one end of the other section, one of said sections being folded along a fold line spaced from one end thereof in the overlapping zone, a block of reinforcing material overlying at least portions of the sections in the overlapping zone, said pair of sections and block having a line of stitching passing through the juxtaposed portions of the sections along said fold line, said stitching being interrupted intermediately of its ends to provide a gap defining an eye spaced from the said end of the waistband, the overlapping portions of the sections of material bordering said stitching constituting seam allowances, said seam allowances having longitudinal slits spaced from the upper and lower edges and at opposing sides of said eye with the portions between said slits arranged flat on one of said sections with said block interposed therebetween, and bar tacks uniting the superimposed pieces of material, including the last referred to section, said block and the last referred to portions of the seam allowances between the slits to define a reinforced pocket adapted to receive a hook, a metal plate apertured at one end transversely thereof and having oppositely disposed ears formed on its lateral edges intermediately of the ends thereof, said plate being doubled upon itself adjacent said ears to provide a hook, said hook being positioned in said pocket and embracing a folded edge of one of the sections at the eye and said block, the ears of said plate abutting the stitching on opposite sides of the eye, and bar tacks extending through the aperture of said plate and securing the plate to the inner end of said pocket, and cooperating fastener means on the other end of the waistband adapted to cooperate with said hook when the waistband is in body encircling position.

13. In a nether garment, a waistband, one end of said waistband comprising two overlapping sections of material, one of said sections extending beyond one end of the other section, one of said sections being folded along a fold line spaced from one end thereof in the overlapping zone, said pair of sections having a line of stitching passing through the juxtaposed portions of the sections along said fold line, said stitching being interrupted intermediately of its ends to provide a gap defining an eye spaced from the said end of the waistband, and a U-shaped metal protector disposed transversely of the line of stitching and clampingly embracing the folded section along the fold line thereof, and cooperating fastener means on the other end of the waistband adapted to cooperate with said eye and protector when the waistband is in body encircling position.

14. The method of forming a waistband with an eye which consists of the steps of cutting a piece of material to form a fly having an integral tongue narrower than said piece of material extending from the upper end thereof at one side, notching the edge of said material at said one side and below said tongue a distance equal to the length of said tongue, folding the tongue downwardly upon the body of the piece of material with the free end of the tongue aligned with the notch, joining said tongue and body of the piece of material by a line of stitching parallel to and spaced inwardly from the edge at said one side, interrupting said stitching intermediately of its ends to provide a gap serving as an eye, severing the body of the piece of material with the tongue from the fly along a line transversely of the material and aligned with the notch, severing the tongue from the body of the material at the fold line, unfolding said tongue along the line of stitching and pressing a crease along the line of stitching, superimposing the body piece and attached tongue upon the fly with the outer free edge of the tongue aligned with the edge of said fly, and stitching said severed pieces and fly together by at least one line of stitching.

15. The method of forming a waistband with an eye which consists of the steps of cutting a piece of material to form a fly having an integral tongue narrower than said piece of material extending from the upper end thereof at one side, notching the edge of said material at said one side and below said tongue a distance equal to the length of said tongue, folding the tongue downwardly upon the body of the piece of material with the free end of the tongue aligned with the notch, joining said tongue and body of the piece of material by a line of stitching parallel to and spaced inwardly from the edge at said one side, interrupting said stitching intermediately of its ends to provide a gap serving as an eye, severing the body of the piece of material with the tongue from the fly along a line transversely of the material and aligned with the notch, severing the tongue from the body of the material at the fold line, unfolding said tongue along the line of stitching and pressing a crease along the line of stitching, superimposing the body piece and attached tongue upon the fly with the outer free edge of the tongue aligned with the edge of said fly, stitching said severed pieces and fly together by at least one line of stitching, inserting an apertured hook attached to a block of stay material into said gap transversely of said interrupted line of stitching to embrace the folded edge of the body of the piece of material at the gap, and securing the hook to the body of the piece of material by bar tacks through the apertured hook.

LOUIS MARKIN.

REFERENCES CITED

The following references are of record in the file of this patent:

UNITED STATES PATENTS

| Number | Name | Date |
|---|---|---|
| 408,300 | Ewig | Aug. 6, 1889 |
| 816,750 | Smith | Apr. 3, 1906 |
| 834,942 | Stein et al. | Nov. 6, 1906 |
| 1,118,741 | Clark | Nov. 24, 1914 |
| 2,194,100 | Shikler | Mar. 19, 1940 |

FOREIGN PATENTS

| Number | Country | Date |
|---|---|---|
| 2,719 | Great Britain | of 1912 |